United States Patent
Guan et al.

(10) Patent No.: US 12,192,211 B2
(45) Date of Patent: *Jan. 7, 2025

(54) MULTI-FACTOR AUTHENTICATION USING CONFIDANT VERIFICATION OF USER IDENTITY

(71) Applicant: Capital One Services, LLC, McLean, VA (US)

(72) Inventors: Jonathan Guan, Cupertino, CA (US); Jonatan Yucra Rodriguez, San Francisco, CA (US); Jennifer Chu, San Francisco, CA (US); Sahil Verma, San Francisco, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/468,100

(22) Filed: Sep. 15, 2023

(65) Prior Publication Data

US 2024/0007476 A1    Jan. 4, 2024

Related U.S. Application Data

(63) Continuation of application No. 17/173,882, filed on Feb. 11, 2021, now Pat. No. 11,811,777.

(51) Int. Cl.
*G06F 21/00* (2013.01)
*H04L 9/40* (2022.01)

(52) U.S. Cl.
CPC ........ *H04L 63/102* (2013.01); *H04L 63/0861* (2013.01); *H04L 63/0884* (2013.01); *H04L 2463/082* (2013.01)

(58) Field of Classification Search
CPC .............. H04L 63/102; H04L 63/0861; H04L 63/0884; H04L 2463/082
See application file for complete search history.

(56) References Cited

U.S. PATENT DOCUMENTS

| | | | | |
|---|---|---|---|---|
| 9,166,961 | B1* | 10/2015 | Johansson | H04L 63/102 |
| 2009/0169062 | A1* | 7/2009 | Cheung | G06Q 30/02 |
| | | | | 382/115 |
| 2011/0167059 | A1* | 7/2011 | Fallah | G06Q 30/08 |
| | | | | 707/723 |
| 2011/0277025 | A1* | 11/2011 | Counterman | G06F 21/40 |
| | | | | 726/8 |
| 2012/0204225 | A1* | 8/2012 | Cohen | G06F 21/32 |
| | | | | 726/3 |

(Continued)

*Primary Examiner* — Kendall Dolly
(74) *Attorney, Agent, or Firm* — Harrity & Harrity, LLP

(57) ABSTRACT

In some implementations, a server device may receive, from a client device, a login credential associated with a user and a request to access a resource. The server device may identify a confidant associated with the user and a confidant device associated with the confidant, wherein the confidant device is different from a user device associated with the user. The server device may transmit, to the confidant device, a request to verify an identity of the user. The server device may determine whether a verification of the identity of the user is received from the confidant device. The server device may grant or deny access to the resource based on determining whether the verification of the identity of the user is received from the confidant device.

20 Claims, 7 Drawing Sheets

(56) References Cited

U.S. PATENT DOCUMENTS

| | | | | |
|---|---|---|---|---|
| 2016/0125490 A1* | 5/2016 | Angal | .................... | G06Q 30/06 |
| | | | | 705/26.35 |
| 2016/0378329 A1* | 12/2016 | Narita | ................. | G06F 3/04883 |
| | | | | 709/226 |
| 2017/0078880 A1* | 3/2017 | Likar | .................... | H04W 8/005 |
| 2017/0124540 A1* | 5/2017 | Chan | .................... | G06V 40/172 |
| 2020/0374286 A1* | 11/2020 | Agarwal | ................ | G06V 40/20 |
| 2021/0058395 A1* | 2/2021 | Jakobsson | ............. | H04L 67/306 |
| 2021/0081947 A1* | 3/2021 | Hockey | ............... | H04L 63/0838 |
| 2022/0255945 A1 | 8/2022 | Guan et al. | | |

* cited by examiner

MULTI-FACTOR AUTHENTICATION USING CONFIDANT VERIFICATION OF USER IDENTITY

RELATED APPLICATION

This application is a continuation of U.S. patent application Ser. No. 17/173,882, filed Feb. 11, 2021, which is incorporated herein by reference in its entirety.

BACKGROUND

Multi-factor authentication (MFA) is an authentication technique in which a user of a computing device is granted access to a resource (e.g., a computing resource, a network resource, or an application) only after successfully proving two or more factors to an authentication service. The two or more factors may include knowledge (e.g., something only the user knows), possession (e.g., something only the user has), and/or inherence (e.g., something only the user is).

SUMMARY

In some implementations, a system for authenticating a user for access to a resource includes one or more memories, and one or more processors, communicatively coupled to the one or more memories, configured to: receive, from a client device, a login credential associated with the user and a request to access the resource; transmit, to a confidant device associated with a confidant registered with a user account of the user, a request to verify an identity of the user, wherein the confidant is different from the user, and wherein the confidant device is different from a user device associated with the user and registered with the user account of the user; determine whether a verification of the identity of the user is received from the confidant device; and grant or deny access to the resource based on determining whether the verification of the identity of the user is received from the confidant device.

In some implementations, a method for multi-factor authentication includes receiving, by a server device and from a client device, a login credential associated with a user and a request to access a resource; identifying, by the server device, a confidant associated with the user and a confidant device associated with the confidant, wherein the confidant device is different from a user device associated with the user; transmitting, by the server device and to the confidant device, a request to verify an identity of the user; determining, by the server device, whether a verification of the identity of the user is received from the confidant device; and granting or denying access to the resource based on determining whether the verification of the identity of the user is received from the confidant device.

In some implementations, a non-transitory computer-readable medium storing a set of instructions includes one or more instructions that, when executed by one or more processors of a server device, cause the server device to: register, in a user account associated with a user, confidant information associated with a confidant identified by the user, wherein the confidant information includes a device identifier of a confidant device associated with the confidant; receive, from a client device, a login credential associated with the user and a request to access a resource; transmit, to the confidant device, a request to verify an identity of the user; determine whether a verification of the identity of the user is received from the confidant device; and grant or deny access to the resource based on determining whether the verification of the identity of the user is received from the confidant device.

DETAILED DESCRIPTION

Figure 1A:
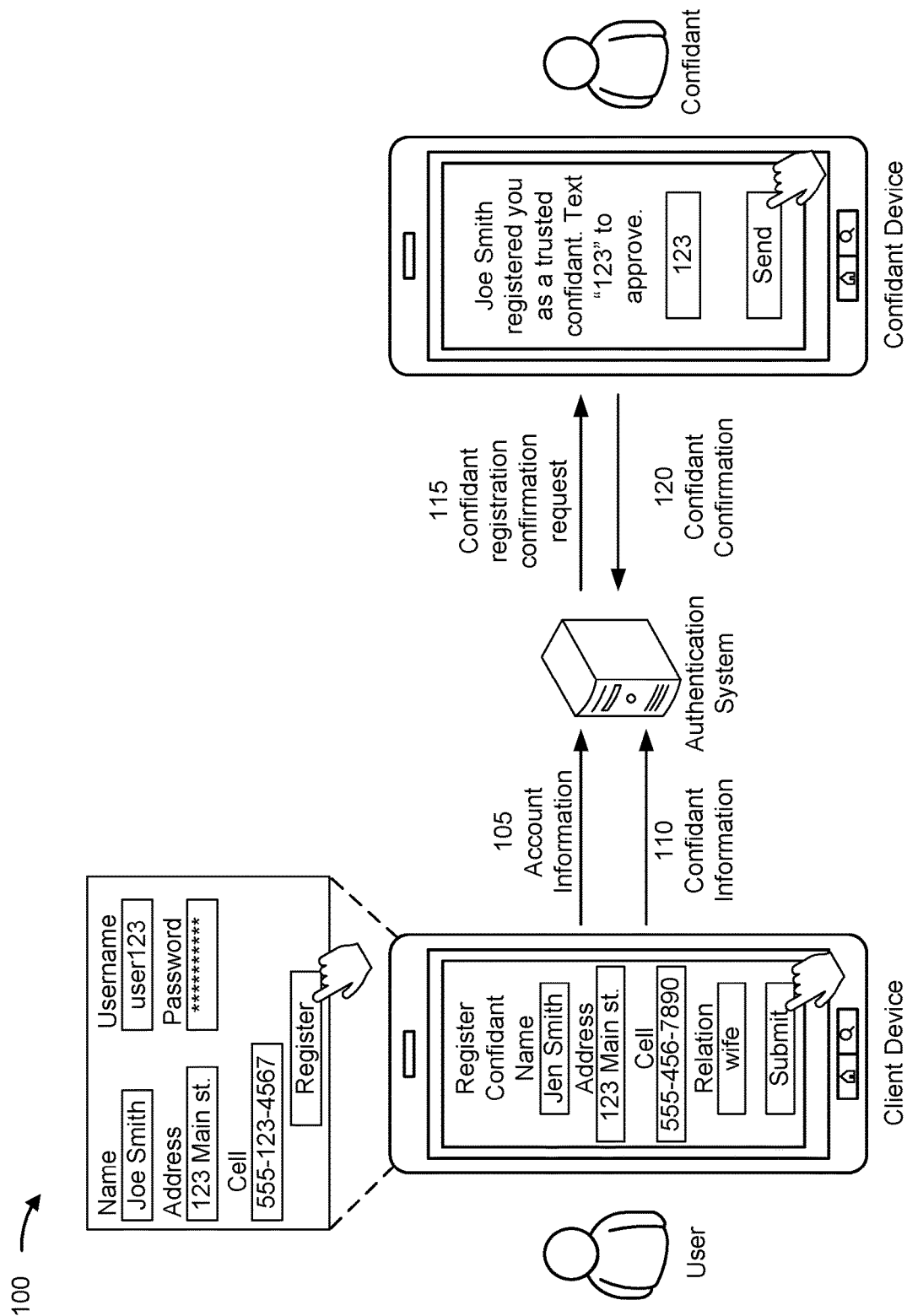
FIGS. 1A-1D are diagrams of an example implementation relating to multifactor authentication using confidant verification of user identity.

The following detailed description of example implementations refers to the accompanying drawings. The same reference numbers in different drawings may identify the same or similar elements.

Short Message Service One-Time Password (SMS OTP) is a type of multi-factor authentication (MFA) used to verify a user's identity to determine whether to grant a computing device, associated with the user, access to a network resource. SMS OTP typically involves sending a numerical passcode, that is valid for only a short time, to a secondary contact point (e.g., a smartphone) that is known to be owned by the user. The user subsequently enters the numerical passcode into a prompt on the computing device on which the user initially requested access to the network resource.

One problem with SMS-based MFA, such as SMS OTP, is that SMS-based MFA is vulnerable to Subscriber Identity Module (SIM)-swapping attacks, in which a malicious person convinces a telecommunications company that provides service for a victim's mobile device to switch the telephone number for the victim's mobile device from a SIM card in the victim's mobile device to a SIM card in another mobile device. This allows the malicious person to receive all SMS messages and voice calls intended for the victim's mobile device, and thus intercept any one-time passcodes sent via SMS or voice call. One way to protect against unauthorized access of a network resource using SMS-based MFA due to a SIM-swapping is to prevent a user from accessing the network resource for a certain amount of time after the telephone number associated with the user's mobile device is switched to a new SIM card. However, this may also prevent an authorized user from accessing the network resource when the user switches to a new mobile device.

In some implementations, in order to solve the problems described above, as well as a related technical problem of how to verify an identity of a user in possession of a user device when authentication messages, such as one-time passcodes, may be sent to an incorrect user device due to a SIM-swap, a technical solution is described herein for performing MFA using confidant verification of the user identity. An authentication system may receive, from a client device, a login credential associated with a user and a request to access a resource. The authentication system may transmit, to a confidant device associated with a confidant registered with a user account of the user, a request to verify the identity of the user. The confidant is a party who is different from the user, and the confidant device is different from a user device associated with the user and registered with the user account of the user. The confidant may be a party that has a trusted relationship with the user. The authentication server may determine whether a verification of the identity of the user is received from the confidant device, and the authentication server may grant or deny access to the resource based on the determination of whether the verification of the identity of the user is received from the confidant device. As a result, the authentication system may prevent unauthorized access to the resource from a malicious person using SIM swapping to pose as the user, and allow access to the resource for a user whose identity is verified by the confidant verification.

FIGS. 1A-1D are diagrams of an example 100 associated with MFA using confidant verification of user identity. As shown in FIGS. 1A-1D, example 100 includes a client device, an authentication system, a confidant device, and a user device. These devices are described in more detail in connection with FIGS. 2 and 3.

As shown in FIG. 1A, and by reference number 105, during registration of a user account associated with a user, the client device may transmit, to the authentication system, account information associated with a network resource. The user may input the account information to the client device via an input component of the client device. In some implementations, the account information may include account information for establishing the user account associated with the network resource. The account information may include a login credential associated with the user. The login credential may include a username and a password associated with the user. In some implementations, the account information may also include a name of the user and contact information, such as an email address, a telephone number, and/or an address, among other examples, for the user. In some implementations, the account information may be associated with a financial account, such as a checking account, a savings account, or a credit card account, for the user. The authentication system may store the account information associated with the user account in a data structure.

In some implementations, the network resource may include a computing resource (e.g., a server device, a cloud computing device, and/or a network device), a software resource (e.g., an application, a computer program, and/or a website), a financial account (e.g., a credit card account, a checking account, or a savings account), an account associated with an intranet, and/or a resource that enables modification to an account (e.g., a user account or a financial account), among other examples. The authentication system may be associated with an entity, such as a financial institution (e.g., a bank, a retail bank, an investment bank, and/or a credit card company), an online retailer, or a gaming entity, and may store and/or manage the account information associated with the user.

As further shown in FIG. 1A, and by reference number 110, the client device may transmit, to the authentication system, confidant information to register a confidant associated with the user account. The confidant may be a party other than the user that is registered with the user account of the user and can verify the identity of the user. For example, the confidant may be a person with a trusted relationship (e.g., spouse, parent, child, friend, etc.) with the user. The confidant information may include a telephone number (and/or another device identifier) for a confidant device associated with the confidant. The confidant device may be a mobile device associated with the confidant that is different from the user device that is associated with the user. In some implementations, the confidant information may also include a name of the confidant, relation of the confidant to the user, and additional contact information for the confidant, such as an email address and/or a postal address, among other examples.

The user may input the confidant information to the client device via an input component of the client device. In some implementations, the user may input confidant information for multiple confidants to the client device, and the client device may transmit the confidant information for the multiple confidants to the authentication system to register multiple confidants with the user account of the user.

As further shown in FIG. 1A, and by reference number 115, the authentication system may transmit, to the confidant device, a request to confirm registration of the confidant with the user account of the user. The authentication system may transmit the request to confirm the confidant registration based on receiving the confidant information from the client device. In some implementations, the authentication system may transmit the request via an SMS message. Alternatively, the authentication system may transmit the request via a voice call, an email message, or another messaging protocol. The request to confirm the confidant registration may inform the confidant that the user has selected the confidant as a trusted confidant to verify the identity of the user and request that the confidant send a confirmation message to the authentication system to complete the confidant registration. For example, the request to confirm the confidant registration may include a passcode (e.g., a numeric code or password) and a request for the confidant to respond with an SMS message including the passcode to confirm the confidant registration.

As further shown in FIG. 1A, and by reference number 120, the confidant device may transmit, to the authentication system, a confidant confirmation. For example, the confidant device may transmit, to the authentication system, an SMS message including the passcode indicated in the request to confirm the confidant registration. Alternatively, the confidant device may transmit the confidant confirmation to the authentication system via a voice call (e.g., by the confidant inputting a passcode) or an email message. The authentication system may receive the confidant confirmation from the confidant device and register the confidant to the user account of the user based on receiving the confidant confirmation. For example, the authentication system may store the confidant information associated with the confidant in a data structure with the account information associated with the user account.

In some implementations, the authentication system may transmit, to the confidant device, a request for secondary authentication information associated with the confidant. The secondary authentication information is authentication information that may be used to authenticate the confidant when the confidant is verifying the identity of the user. For example, the secondary authentication information may include an image of the confidant, a voice sample of the confidant, and/or a confidant password, among other examples. The confidant device may transmit the secondary authentication information to the authentication system. The authentication system may receive the secondary authentication information from the confidant device and store the secondary authentication information with the confidant information for the confidant and the user account information associated with the user.

Figure 1B:
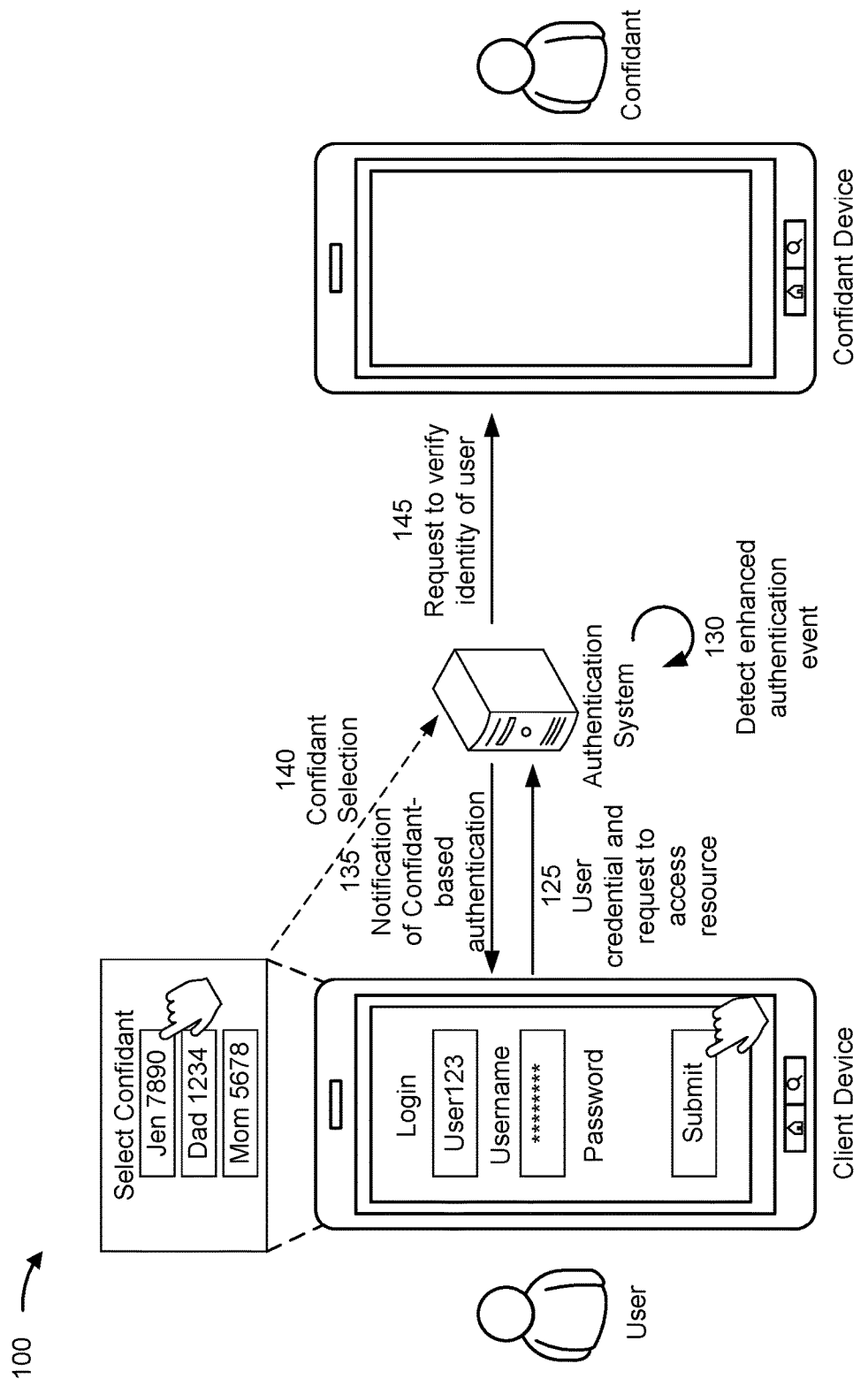

As shown in FIG. 1B, and by reference number 125, at a time subsequent to the registration of confidant with the user account associated with the user, the client device may transmit, to the authentication system, the login credential associated with the user and a request to access the network resource. In some implementations, the user may enter the login credential (e.g., username and password) into a prompt displayed in a web browser or another application executing on the client device. The client device that transmits the login credential to the authentication system may be the same client device as, or a different client device from, the client device that transmits the account information and the confidant information to the authentication system during registration.

Although implementations are described herein in connection with authenticating a user to grant or deny access to a network resource, the techniques described herein may be used to authenticate a user to grant or deny access to a physical resource, such as a building, a room, a parking lot, or a secure area. In such examples, the login credential and the request to access the resource (e.g., a physical resource) may be transmitted based on a user interaction with a security device (e.g., which may include a lock, a deadbolt, a turnstile, or the like), such as by inputting an access number to the security device (e.g., using a physical or virtual keypad), swiping an access card using the security device (e.g., via a magnetic stripe reader), or moving an access card within communicative proximity of the security device (e.g., for near-field communication).

As further shown in FIG. 1B, and by reference number 130, the authentication system may detect an enhanced authentication event associated with the request to access the network service. An enhanced authentication event, or "step-up" authentication event, may be an event that triggers a request for confidant verification of the user identity. In some implementations, the authentication may detect an enhanced authentication event based on detecting a condition associated with a SIM swap. For example, the authentication may detect an enhanced security event based on a determination that a telephone number (and/or another device identifier) of the user device associated with the user has changed to a new or different SIM card within a threshold time window.

Additionally, or alternatively, the authentication system may detect an enhanced authentication event based on a security level associated with the network resource to which the user is requesting access and/or a security level associated with a user-requested action associated with the network resource. For example, the authentication system may detect an enhanced authentication event based on receiving the login credential and the request to access the network resource from a client device other than a client device previously used by the user to access the network resource. In some implementations, the authentication system may detect an enhanced authentication event based on receiving a partial login credential from the client device. For example, the enhanced security authentication may occur when the user forgets the password associated with the user account and requests that the password be reset, or that a new password be issued. In some implementations, the authentication system may detect an enhanced authentication event based on detecting that the user is requesting an action associated with an enhanced security level, such as requesting to change certain account information (e.g., username, password, contact information, confidant information, or other sensitive information) and/or requesting a financial transaction involving an amount of money above a threshold amount, among other examples.

In some implementations, different enhanced authentication events may be associated with different security levels. In such cases, the different security levels may be associated with different types of confidant-based verification of the user identity. The authentication system may detect the enhanced authentication event, determine the security level associated with the enhanced authorization event, and select a type of confidant-based verification based on the security level of the detected enhanced security event. In some implementations, the user may select settings relating to the security levels associated with different enhanced security events and/or the types of confidant-based verification associated with the different security levels. For example, the user may select the settings during the registration of the user account. Examples of different types of confidant-based verification are described below in connection with FIG. 1C.

As further shown in FIG. 1B, and by reference number 135, the authentication system may transmit, to the client device, a notification that confidant-based authentication is being requested. The authentication system may transmit the notification to the client device based on a determination, by the authentication system, to request confidant-based authentication of the user's identity. In some implementations, the authentication system may determine to request confidant-based verification of the user identity based on detecting an enhanced authentication event. In some implementations, the authentication system may determine to request confidant-based verification of the user identity independent of detecting an enhanced security event. In some implementations, the authentication system may determine to request confidant-based verification in addition to performing SMS-based MFA with the user device associated with the user. In some implementations, the authentication system may determine to request confidant-based verification of the user identity without performing SMS-based MFA with the user device. The client device may be the same device as the user device associated with the user, or the client device may be a different device from the user device associated with the user. In some implementations, the authentication system may transmit the notification to the user device (e.g., via an SMS message) in addition to, or instead of, transmitting the notification to the client device.

As further shown in FIG. 1B, and by reference number 140, the client device may transmit, to the authentication system, a selection of a confidant to be used for the confidant-based verification of the user identity. As described above, multiple confidants may be registered with the user account of the user. In some implementations, the authentication system may identify the confidants registered with the user account of the user, and the authentication system may transmit a list of the confidants to the client device. The client device may display the list of confidants (e.g., in a web browser or other application executing on the client device) and prompt the user to select, from the list of confidants, a confidant to be used for confidant-based verification of the identity of the user. The user may select the confidant from the list of confidants, and the client device may transmit an indication of the selected confidant to the authentication system.

In some implementations, the authentication system may automatically identify the confidant without receiving a selection of the confidant from the user device. In this case, the authentication may identify one or more confidants registered with the user account of the user, and automatically select a confidant from the one or more confidants registered with the user. In some implementations, the authentication system may select a confidant from multiple confidants registered with the user account based on respective priorities associated with the confidants. For example, the respective priorities for the confidants may be set by the user when the confidants are registered with the user account. In some implementations, when there are multiple confidants registered with the user account, the authentication system may randomly select a confidant from the multiple confidants.

As further shown in FIG. 1B, and by reference number 145, the authentication system may transmit, to the confidant device associated with the confidant, a request to verify the identity of the user. In some implementations, the request may include information identifying the network resource that the user is attempting to access, and the request may ask the confidant to verify that it is actually the user who is trying to access the network resource. In some implementations, the authentication system may transmit a verification challenge to the confidant device and request a challenge response from the confidant device to verify the identity of the user.

Figure 1C:
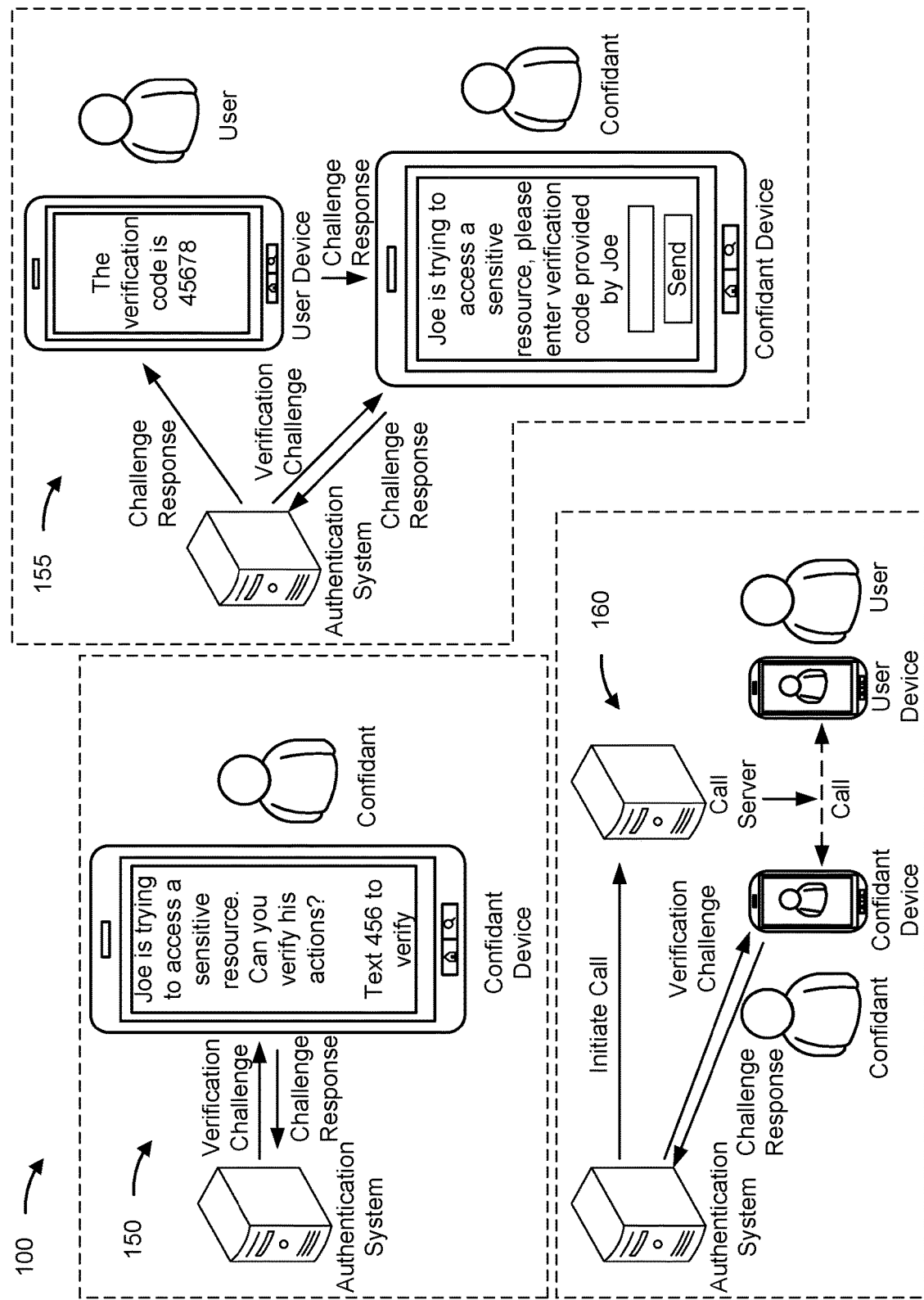

As shown in FIG. 1C, and by reference number 150, in some implementations, the authentication system may transmit, to the confidant device, a verification challenge that includes an indication of the challenge response. For example, the authentication system may transmit, to the confidant device, a verification challenge including a verification code (shown as "456") and request a challenge response including the verification code to verify the identity of the user. The confidant may enter the verification code to the confidant device, and the confidant device may transmit a challenge response (e.g., via an SMS message) including the verification code to the authentication system to provide verification of the identity of the user to the authentication system. For example, the confidant may enter the verification code based on a determination, by the confidant, that it is the user who is requesting access to the network resource. The authentication system may determine that a verification of the identity of the user is received from the confidant device based on receiving the challenge response including the verification code.

As shown in FIG. 1C, and by reference number 155, in some implementations, the authentication system may transmit a verification challenge to the confidant device, and the authentication system may transmit a challenge response to the verification challenge to the user device associated with the user. For example, the authentication system may transmit a verification challenge requesting a verification code to the confidant device, and the authentication system may transmit the verification code (shown as "45678") to the user device. In this case, the verification challenge may include an instruction for the confidant to obtain the challenge response from the user. In order to verify the identity of the user, the confidant may obtain the challenge response from the user. For example, the confidant device may receive, from the user device, a message (e.g., SMS message or email) including the challenge response. Alternatively, the confidant may obtain the challenge response in a voice call or video call between the confidant device and the user device. Once the confidant obtains the challenge response, the confidant may enter the challenge response to the confidant device, and the confidant device may transmit the challenge response to the authentication system. The authentication system may determine whether the verification of the identity of the user is received from the confidant device based on a comparison of the challenge response sent to the user device (e.g., the "first challenge response") with the challenge response received from the confidant device (e.g., the "second challenge response").

In the confidant-based verification described above in connection with reference number 155, since the confidant obtains the challenge response from the user, the authentication system ensures that there is some communication between the confidant and the user and/or between the confidant device and the user device. This may encourage the confidant to more carefully verify whether the actual user associated with the user account is requesting access to the network resource and in possession of the user device, and thus may provide a benefit of increased accuracy of the confidant-based verification.

In some implementations, instead of transmitting the verification challenge to the confidant device and transmitting the challenge response to the user device, the authentication system may transmit, to both the user device and the confidant device, a challenge question relating to temporal verification information associated with the user. The temporal verification information may be temporal information associated with the user that can be obtained by the confidant and used to verify the identity of the user. For example, the temporal verification information may be a characteristic (e.g., color or brand, among other examples) of an item of clothing currently being worn by the user, a location of the user, or a weather condition associated with the location of the user, among other examples. The challenge question may be a question that requests the temporal verification information associated with the user (e.g., "What color shirt is the user wearing?").

The authentication system may transmit, to the user device (e.g., via an SMS message), the challenge question, and the authentication system may receive, from the user device, a first challenge answer indicating the temporal verification information associated with the user. The authentication system may transmit the challenge question to the confidant device. The confidant may obtain the temporal verification information from the user. For example, the confidant may obtain the temporal verification information via a message from the user device to the confidant device, a voice call or video call between the confidant device and the user device, or an in-person interaction with the user, among other examples. The confidant may input the temporal verification information to the confidant device, and the confidant device may transmit, to the authentication system, a second challenge answer indicating the temporal verification information. The authentication system may determine whether the verification of the identity of the user is received based on a comparison of the first challenge and the second challenge answer. For example, the authentication system may compare the first challenge answer and the second challenge answer to determine whether the temporal verification information indicated in the first challenge answer is the same as the temporal verification information indicated in the second challenge answer.

The use of the temporal verification information for confidant-based verification of the identity of the user encourages communication between the confidant and the user. Furthermore, temporal verification information received from the user device that does not match the temporal verification information received from the confidant device may indicate that the user device is not in the possession of the user associated with the user account. Therefore, the use of temporal verification information may provide a benefit of increased security and increased accuracy of the confidant-based verification.

As further shown in FIG. 1C, and by reference number 160, in some implementations, the authentication system may automatically initiate a communication session between the confidant device and the user device. For example, the authentication system may communicate with the call server to initiate a call (e.g., voice call or video call) between the confidant device and the user device. The authentication system may transmit a verification challenge to the confidant device. For example, the authentication system may transmit a verification challenge that includes an indication of the challenge response. Alternatively, the authentication system may transmit the challenge response to the user device, or the authentication system may transmit a challenge question relating to temporal verification information associated with the user to the user device and the confidant device, as described above.

The confidant may verify that the user is in possession of the user device based on the call initiated between the confidant device and the user device. For example, the confidant may see whether the user is on a video call between the confidant device and the user device, or the confidant may determine whether the confidant recognizes a voice of the user on a voice call between the confidant device and the user device. In some implementations, the authentication system may monitor the call, for example, to ensure that the confidant and the user both participate in the call. The confidant may enter the challenge response to the confidant device, and the confidant device may transmit the challenge response to the authentication system. The authentication system may determine whether the verification of the identity of the user is received from the confidant device based on the challenge response.

By automatically initiating the call between the confidant device and the user device, the authentication system can ensure that the confidant communicates directly (e.g., via voice or video) with a person in possession of the user device. Thus, the confidant may verify, with a high degree of certainty, whether the person in possession of the user device is the user or not. Accordingly, automatically initiating a call between the confidant device and the user device may provide a benefit of increased security and increased accuracy of the confidant-based verification.

In some implementations, the authentication system may acquire secondary verification information associated with the confidant during the call between the confidant device and the user device. The authentication may authenticate the confidant based on the secondary verification information. In some implementations, the authentication system may acquire a voice sample of the confidant from the voice call or video call between the confidant device and the user device. In this case, the authentication system may compare the voice sample with voice biometric information associated with the confidant (e.g., from a previous voice sample of the confidant acquired during registration of the confidant with the user account) to authenticate the confidant. For example, the authentication system may compare the voice sample acquired during the call with the voice biometric information using a trained machine learning model that determines whether the voice sample matches the voice biometric information associated with the confidant.

In some implementations, the authentication system may acquire an image of the confidant during the video call between the confidant device and the user device. In this case, the authentication system may compare the image with a stored image of the confidant (e.g., an image of the confidant acquired during registration of the confidant with the user account) to authenticate the confidant. For example, the authentication system may compare the image acquired during the video call with the stored image using a trained machine learning model that determines a similarity between the image acquired during the call and the stored image of the confidant.

Figure 1D:
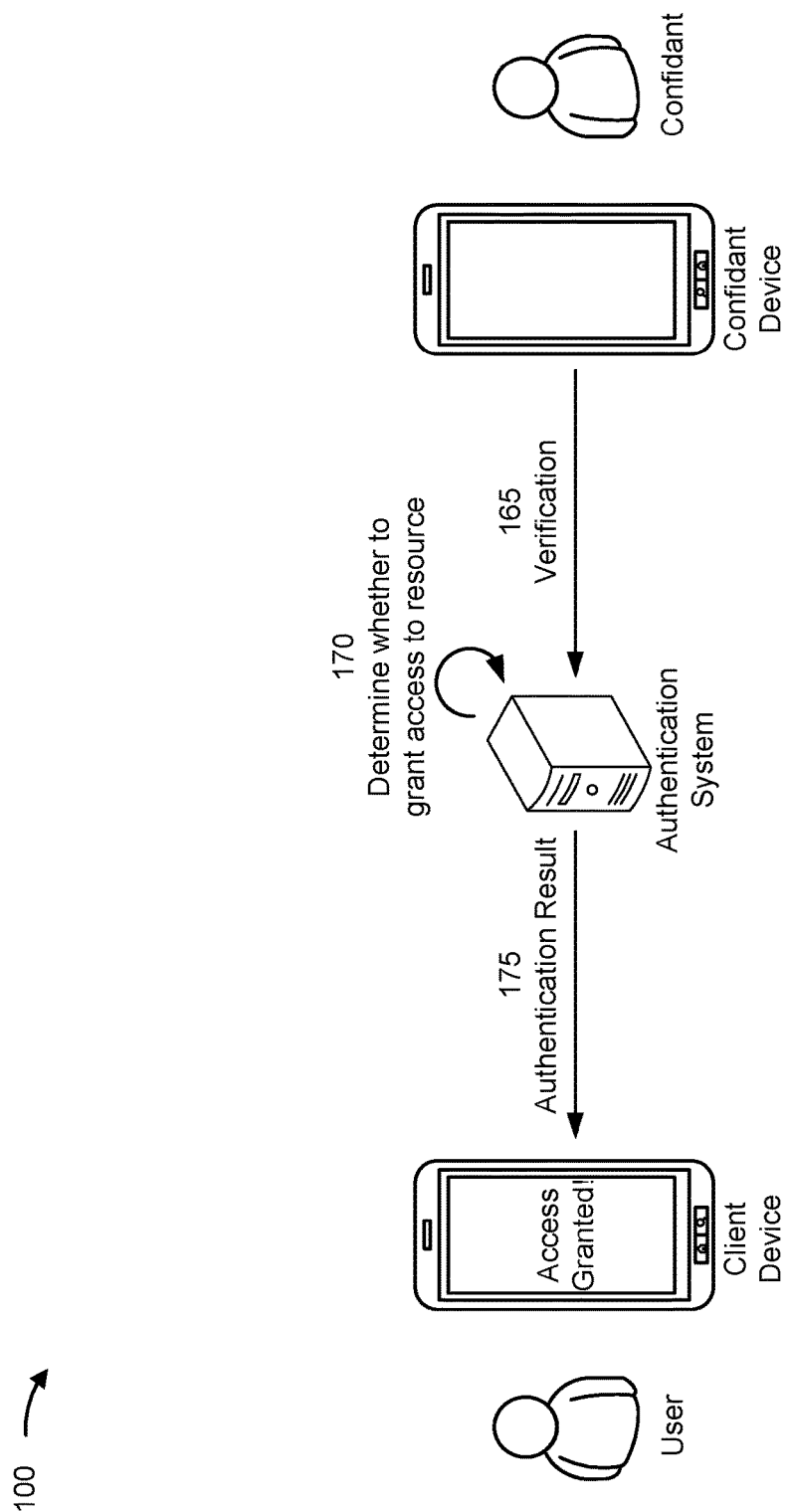

As shown in FIG. 1D, and by reference number 165, the confidant device may transmit, to the authentication system, the verification of the identity of the user. For example, the confidant device may transmit, to the authentication system, a challenge response to a verification challenge received from the authentication system, as described above in connection with FIG. 1C.

In some implementations, the confidant device may transmit an indication that the identity of the user is not verified by the confidant. For example, the authentication system may indicate (e.g., in the verification request) a passcode associated with the user identity not being verified by the confidant, and the confidant device may transmit a message including the passcode to the authentication system based on a determination, by the confidant, that the identity of the user is not verified.

As further shown in FIG. 1D, and by reference number 170, the authentication system may determine whether to grant access to the resource to the client device. In some implementations, the authentication system may determine whether to grant or deny access to the resource based on a determination of whether the verification of the identity of the user is received from the confidant device. For example, the authentication server may determine that the verification of the identity of the user is received from the confidant device based on receiving, from the confidant, a correct challenge response for a verification challenge transmitted to the confidant device, as described above in connection with FIG. 1C. In some implementations, the authentication server may grant access to the resource to the client device based on the determination that the verification of the identity of the user is received from the confidant device. In some implementations, the authentication server may determine that verification of the user identity is not received from the client device based on receiving an incorrect challenge response. In this case, the authentication server may deny access to the resource based on receiving an incorrect challenge response (or receiving a threshold number of incorrect challenge responses).

In some implementations, the authentication system may deny access to the resource based on a determination that the verification of the identity of the user is not received from the confidant device within a time threshold. In some implementations, if no response to the verification request is received from the confidant device within the time threshold, the authentication system may determine whether there are any other confidants registered with the user account. In this case, the authentication system may select a next confidant for confidant-based verification of the identity of the user based on a determination that at least one other confidant is registered with the user account. For example, the authentication system may select the next confidant based on respective priorities associated with the confidants registered with the user account.

In some implementations, the authentication system may determine whether to grant or deny access to the network resource based on whether the verification of the identity of the user is received from the confidant device and based on secondary authentication information associated with the confidant. For example, the authentication system may acquire secondary authentication information (e.g., a voice sample of the confidant, an image of the confidant, or a confidant password, among other examples), and compare the acquired secondary authentication information with stored secondary authentication information associated with the confidant to determine a secondary authentication result for the confidant. The secondary authentication result provides added security by verifying an identity of the confidant in possession of the confidant device, from which the verification of the identity of the user is received. In this case, the authentication system may grant access to the network resource based on receiving the verification of the identity of the user and based on the secondary authentication of the confidant.

As further shown in FIG. 1D, and by reference number 175, the authentication system may transmit an authentication result to the client device based on the determination of whether to grant or deny access to the network resource. The authentication system may transmit, to the client device, a message indicating whether access to the network resource is granted or denied. For example, the message indicating whether access to the network resource is granted or denied may be delivered from the authentication system to the client device, and presented in a web browser or other application executing on the client device. If access is granted, then the authentication system may allow the client device to access the requested network resource. If access is denied, then the authentication system may prevent the client device from accessing the requested network resource.

Using techniques described herein, MFA can be provided using confidant-based verification of a user identity. In this way, vulnerability to SIM-swapping attacks may be reduced, and security may be enhanced.

As indicated above, FIGS. 1A-1D are provided as an example. Other examples may differ from what is described with regard to FIGS. 1A-1D.

Figure 2:
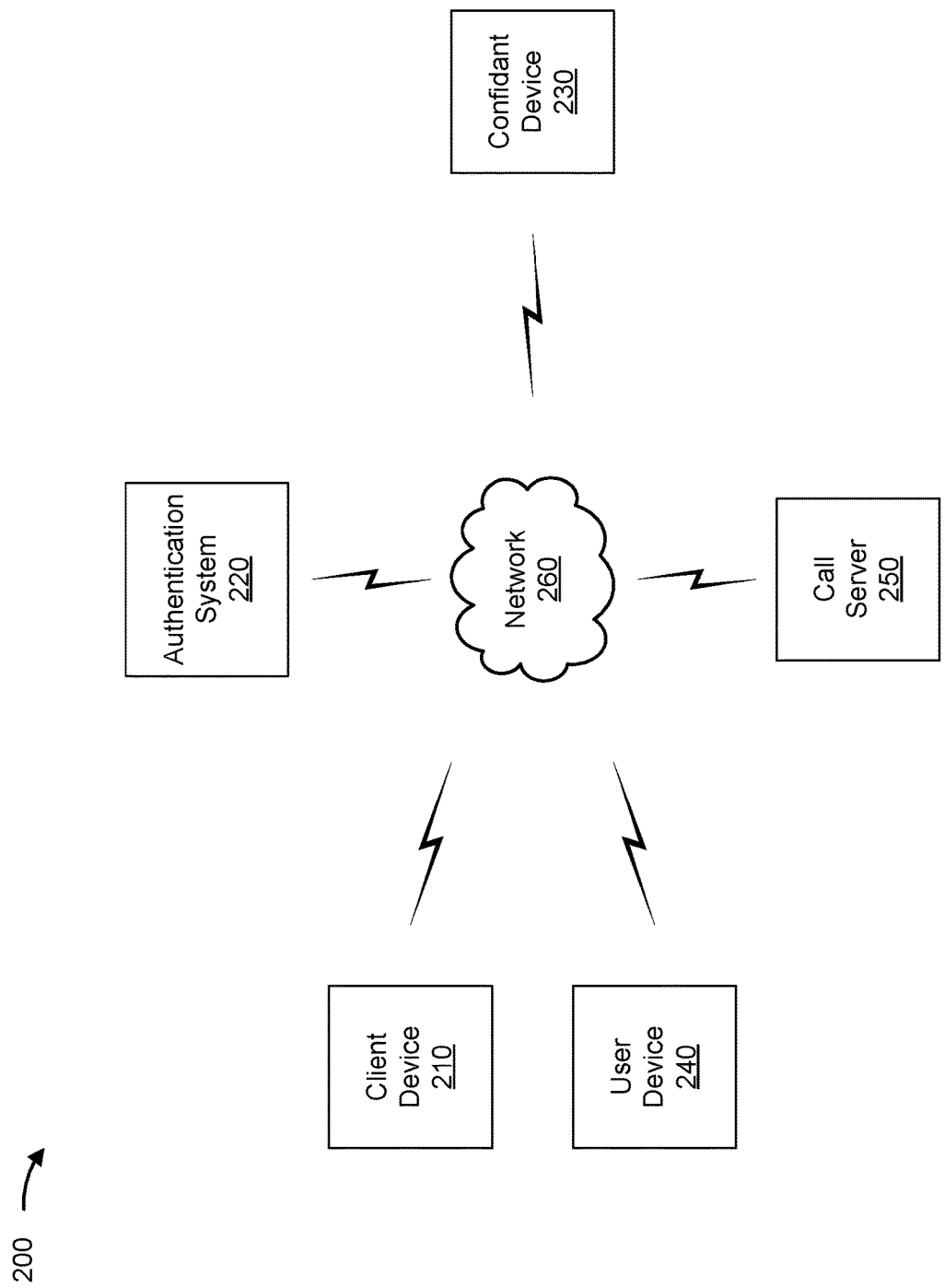
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, an authentication system 220, a confidant device 230, a user device 240, a call server 250, and a network 260. Devices of environment 200 may interconnect via wired connections, wireless connections, or a combination of wired and wireless connections.

The client device 210 includes one or more devices capable of receiving, generating, storing, processing, and/or providing information associated with MFA using confidant verification of user identity, as described elsewhere herein. The client device 210 may include a communication device and/or a computing device. For example, the client device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The authentication system 220 includes one or more devices capable of receiving, generating, storing, processing, providing, and/or routing information associated with MFA using confidant verification of user identity, as described elsewhere herein. The authentication system 220 may include a communication device and/or a computing device. In some implementations, the authentication system 220 includes a server device. For example, the authentication system 220 may include a server, such as an application server, a client server, a web server, a database server, a host server, a proxy server, a virtual server (e.g., executing on computing hardware), or a server in a cloud computing system. In some implementations, the authentication system 220 includes computing hardware used in a cloud computing environment.

The confidant device 230 includes one or more devices capable of receiving, generating, storing, processing, and/or providing information associated with MFA using confidant verification of user identity, as described elsewhere herein. The confidant device 230 may include a communication device and/or a computing device. For example, the confidant device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The user device 240 includes one or more devices capable of receiving, generating, storing, processing, and/or providing information associated with MFA using confidant verification of user identity, as described elsewhere herein. The user device 240 may include a communication device and/or a computing device. For example, the user device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The call server 250 includes one or more devices capable of receiving, generating, storing, processing, providing, and/or routing information associated with MFA using confidant verification of user identity, as described elsewhere herein. In some implementations, the call server 250 may manage the setup or connection of voice and/or video calls. The call server 250 may receive call setup request messages, determine the status of destination devices, check the authorization of users to originate and/or receive calls, and create and send messages to process the call requests. The call server 250 may include a communication device and/or a computing device. For example, the call server 250 may include a server, such as an application server, a client server, a web server, a database server, a host server, a proxy server, a virtual server (e.g., executing on computing hardware), or a server in a cloud computing system. In some implementations, the server 250 includes computing hardware used in a cloud computing environment.

The network 260 includes one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
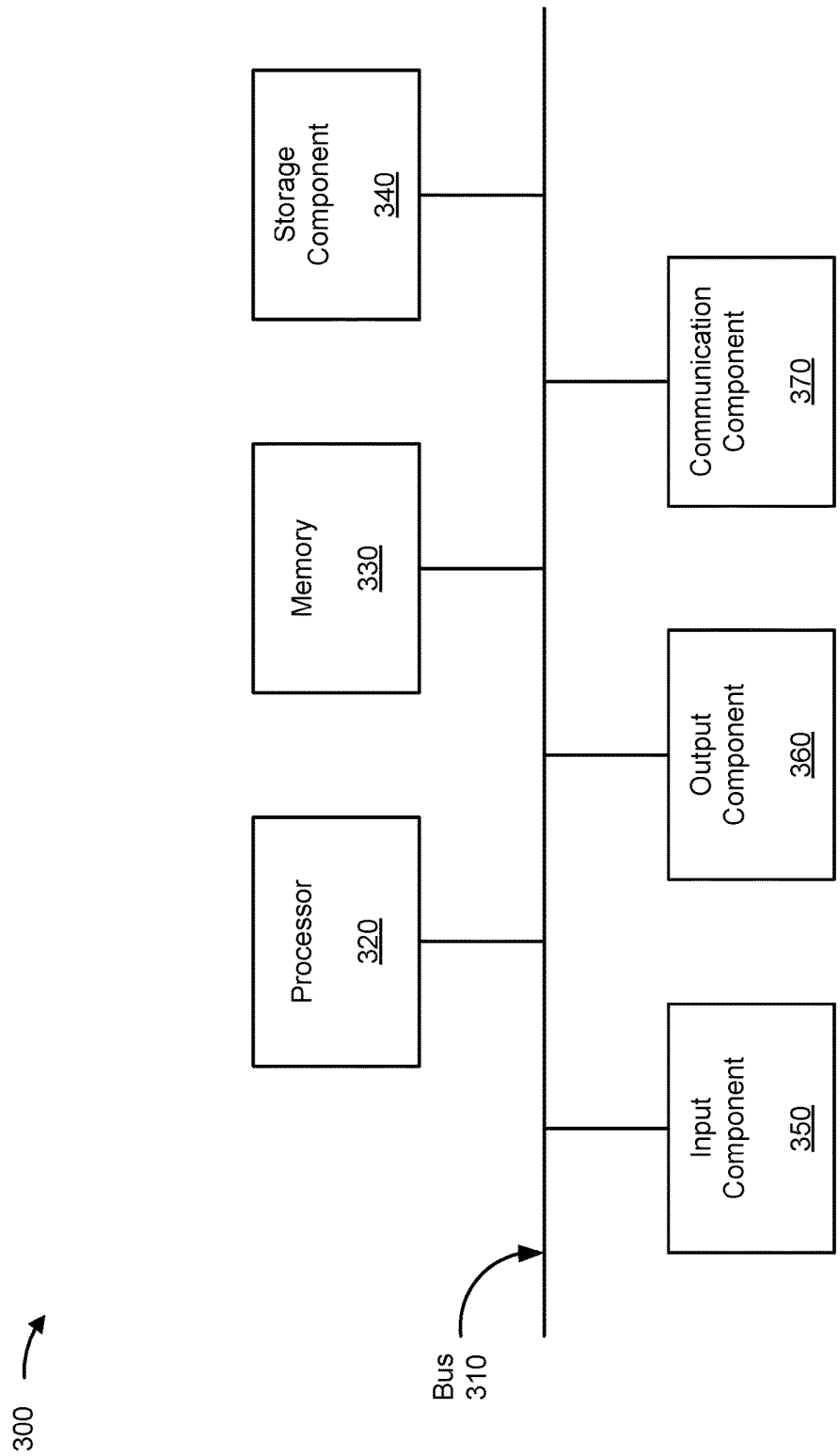
FIG. 3 is a diagram of example components of one or more devices of FIG. 2.

FIG. 3 is a diagram of example components of a device 300, which may correspond to the client device 210, the authentication system 220, the confidant device 230, the user device 240, and/or the call server 250. In some implementations, the client device 210, the authentication system 220, the confidant device 230, the user device 240, and/or the call server 250 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
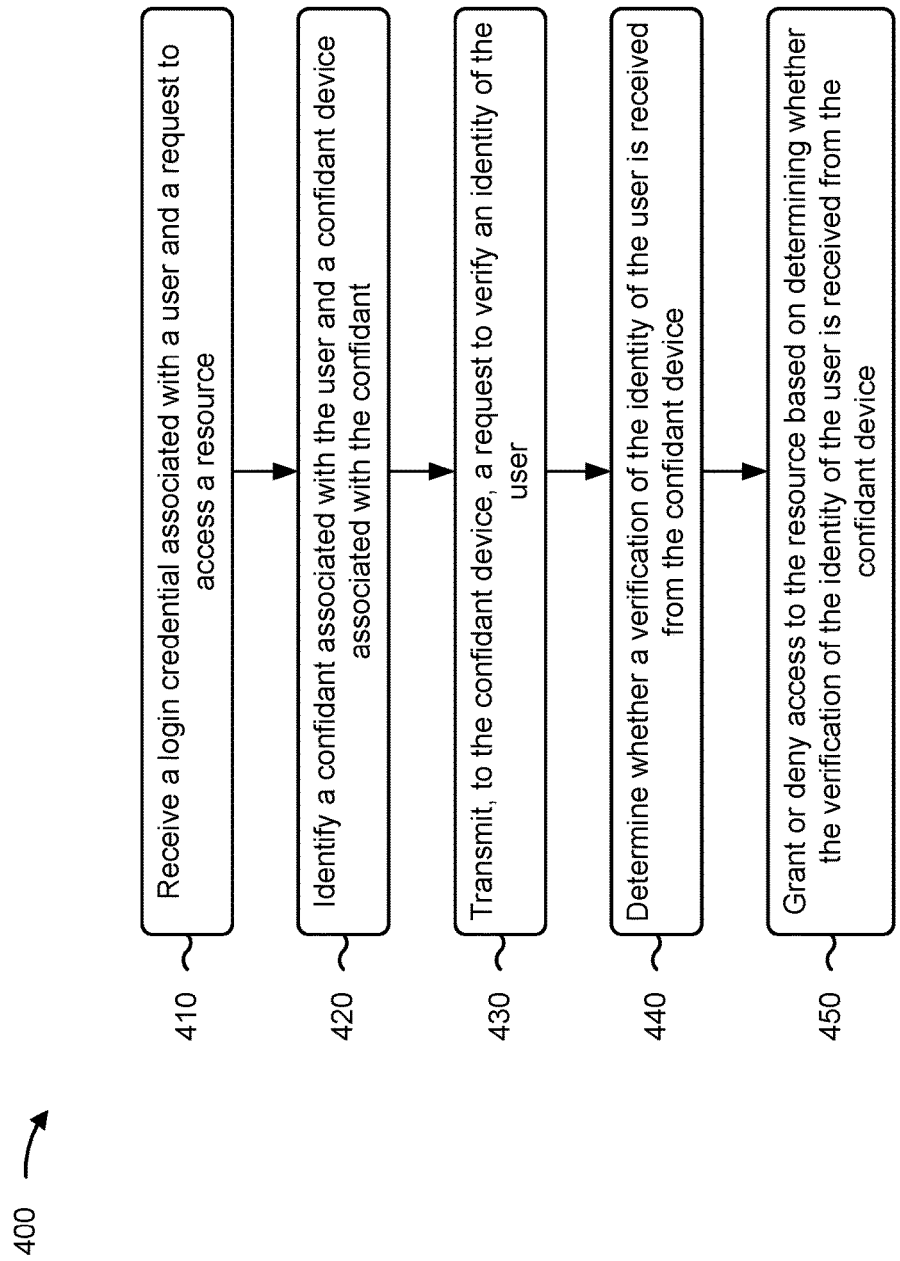
FIG. 4 is a flowchart of an example process relating to multifactor authentication using confidant verification of user identity.

FIG. 4 is a flowchart of an example process 400 associated with MFA using confidant verification of user identity. In some implementations, one or more process blocks of FIG. 4 may be performed by a server device (e.g., authentication system 220). In some implementations, one or more process blocks of FIG. 4 may be performed by another device or a group of devices separate from or including the server device, such as client device 210, confidant device 230, user device 240, and/or call server 250. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from a client device, a login credential associated with a user and a request to access a resource (block 410). As further shown in FIG. 4, process 400 may include identifying a confidant associated with the user and a confidant device associated with the confidant, wherein the confidant device is different from a user device associated with the user (block 420). As further shown in FIG. 4, process 400 may include transmitting, to the confidant device, a request to verify an identity of the user (block 430). As further shown in FIG. 4, process 400 may include determining whether a verification of the identity of the user is received from the confidant device (block 440). As further shown in FIG. 4, process 400 may include granting or denying access to the resource based on determining whether the verification of the identity of the user is received from the confidant device (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for authenticating a user for access to a resource, the system comprising:
    one or more memories storing a set of instructions; and
    one or more processors, communicatively coupled to the one or more memories, configured to execute the set of instructions to:
        receive, from a client device, a login credential associated with the user and a request to access the resource;
        transmit, to a confidant device that is associated with a confidant that is different from the user, a request to verify an identity of the user based on detecting an event that triggers a request for confidant verification of the identity of the user,
        wherein the confidant device is different from a user device associated with the user; and
        grant or deny access to the resource based on determining whether a verification of the identity of the user is received from the confidant device.

2. The system of claim 1, wherein the confidant device is registered with a user account of the user.

3. The system of claim 1, wherein the one or more processors, to transmit the request to the confidant device, are configured to transmit a code, and wherein the one or more processors are further configured to:
    receive a response from the confidant device based on transmitting the request to the confidant device; and
    determine whether the verification of the identity of the user is received from the confidant device based on whether the code is received via the response from the confidant device.

4. The system of claim 1, wherein the one or more processors, to transmit the request to the confidant device, are configured to transmit a challenge, and wherein the one or more processors are further configured to:
    receive, from the confidant device, a challenge response based on transmitting the challenge to the confidant device; and
    determine whether the verification of the identity of the user is received from the confidant device based on a comparison of the challenge response and an additional challenge response associated with the user device.

5. The system of claim 1, wherein the one or more processors, to transmit the request to the confidant device, are configured to transmit a challenge question, and wherein the one or more processors are further configured to:
    receive, from the user device, a first challenge answer associated with temporal verification information associated with the user;
    receive, from the confidant device, a second challenge answer associated with the temporal verification information; and
    determine whether the verification of the identity of the user is received from the confidant device based on a comparison of the first challenge answer and the second challenge answer.

6. The system of claim 1, wherein the one or more processors, to transmit the request to the confidant device, are configured to transmit a challenge to the confidant device, and wherein the one or more processors are further configured to:
    receive a challenge response from the confidant device based on a communication session initiated between the confidant device and the user device; and
    determine whether the verification of the identity of the user is received from the confidant device based on the challenge response.

7. The system of claim 6, wherein the one or more processors, to determine whether the verification of the identity of the user is received from the confidant device, are configured to:
    determine whether the verification of the identity of the user is received from the confidant device based on a result of comparing an acquired voice sample of the confidant to voice biometric information associated with the confidant.

8. The system of claim 6, wherein the communication session is a video call, and the one or more processors, to determine whether the verification of the identity of the user is received from the confidant device, are configured to:
    determine whether the verification of the identity of the user is received from the confidant device based on a result of comparing an acquired image of the confidant to a stored image of the confidant.

9. The system of claim 1, wherein the one or more processors, to detect the event that triggers the request for confidant verification of the identity of the user, are configured to:
    detect the event based on determining that a subscriber identity module (SIM) of the user device associated with the user has changed within a time window.

10. A method for multi-factor authentication, comprising:
    receiving, by a server device and from a client device, a login credential associated with a user and a request to access a resource;
    transmitting, by the server device and to a confidant device that is associated with a confidant that is different from the user, a request to verify an identity of the user, the request including a challenge transmitted to the confidant device, wherein the confidant device is different from a user device associated with the user;

determining, by the server device, whether a verification of the identity of the user is received from the confidant device based on a challenge response, to the challenge, received from the confidant device; and granting or denying access to the resource based on determining whether the verification of the identity of the user is received from the confidant device.

11. The method of claim 10, further comprising:

transmitting, to the client device, a list of one or more confidants registered with a user account of the user; and receiving, from the client device, a selection of the confidant from the list of the one or more confidants, wherein transmitting the request to the confidant device is based on receiving the selection of the confidant.

12. The method of claim 10, further comprising:

transmitting an additional challenge response to the user device; and comparing the additional challenge response and the challenge response received from the confidant device to determine whether the verification of the identity of the user is received from the confidant device.

13. The method of claim 10, wherein the challenge response includes a first challenge answer, the method further comprising:

receiving, from the user device, a second challenge answer; and comparing the first challenge answer and the second challenge answer to determine whether the verification of the identity of the user is received from the confidant device.

14. The method of claim 13, wherein the first challenge answer and the second challenge answer indicate temporal verification information associated with the user.

15. The method of claim 10, wherein granting or denying access to the resource comprises:

granting or denying access to the resource based on secondary authentication information associated with authenticating the confidant.

16. The method of claim 10, further comprising:

denying access to the resource based on determining that the verification of the identity of the user is not received from the confidant device within a time threshold.

17. A non-transitory computer-readable medium storing a set of instructions, the set of instructions comprising:

one or more instructions that, when executed by one or more processors of a server device, cause the server device to:

receive, from a client device, a login credential associated with a user and a request to access a resource;

transmit, to a confidant device that is associated with a confidant that is different from the user, a request to verify an identity of the user based on detecting an event that triggers a request for confidant verification of the identity of the user, wherein the confidant device is different from a user device associated with the user; and grant or deny access to the resource based on determining whether a verification of the identity of the user is received from the confidant device.

18. The non-transitory computer-readable medium of claim 17, wherein the one or more instructions further cause the server device to:

register, in a user account associated with the user, confidant information identified by the user and associated with the confidant, wherein the confidant information includes a device identifier of the confidant device, and wherein transmitting the request to the confidant device is based on the confidant information registered in the user account.

19. The non-transitory computer-readable medium of claim 18, wherein the one or more instructions, that cause the server device to register, in the user account associated with the user, the confidant information associated with the confidant, cause the server device to:

transmit, to the confidant device, a request to confirm registration of the confidant; and receive, from the confidant device, confirmation of the registration of the confidant, wherein registering the confidant information in the user account is based on receiving the confirmation.

20. The non-transitory computer-readable medium of claim 17, wherein the one or more instructions, that cause the server device to grant or deny access to the resource, cause the server device to:

grant or deny access to the resource based on authenticating the confidant using secondary authentication information associated with the confidant.

* * * * *